US009538287B2

(12) United States Patent
Schreyer

(10) Patent No.: US 9,538,287 B2
(45) Date of Patent: Jan. 3, 2017

(54) DC VOLTAGE ERROR PROTECTION CIRCUIT

(75) Inventor: Earl Schreyer, Carlsbad, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 1062 days.

(21) Appl. No.: 13/447,448

(22) Filed: Apr. 16, 2012

(65) Prior Publication Data

US 2012/0319776 A1 Dec. 20, 2012

Related U.S. Application Data

(60) Provisional application No. 61/475,817, filed on Apr. 15, 2011.

(51) Int. Cl.
*H04B 15/00* (2006.01)
*H04R 3/00* (2006.01)

(52) U.S. Cl.
CPC .................................... *H04R 3/007* (2013.01)

(58) Field of Classification Search
CPC ... H04R 3/007; H04R 19/005; H04R 2460/03; H04R 3/00
USPC .... 381/120, 121, 94.8, 28, 104–108, 55–59; 330/150, 151, 254, 251, 133; 379/395
See application file for complete search history.

(56) References Cited

U.S. PATENT DOCUMENTS 5,070,527 A * 12/1991 Lynn ............................ 379/395
5,815,584 A * 9/1998 Whitecar et al. ............... 381/86
6,577,737 B1 * 6/2003 Krochmal et al. .............. 381/55
2005/0127993 A1 * 6/2005 Yim et al. ..................... 330/133
2008/0054950 A1 3/2008 Lin et al.

FOREIGN PATENT DOCUMENTS

CN 101404480 A * 4/2009 ............... H03F 1/30
CN 102740187 A 10/2012
CN 202773063 U 3/2013
EP 1093220 B1 12/2004

OTHER PUBLICATIONS

"Chinese Application Serial No. 201210110793.3, Office Action mailed May 29, 2014", w/English Translation, 9 pgs.
"Chinese Application Serial No. 201210110793.3, Voluntary Amendments filed on Apr. 20, 2012", English Translation, 1 pg.
"Chinese Application Serial No. 201220160792.5, Amendments filed Apr. 20, 2012", English Translation, 1 pg.

(Continued)

*Primary Examiner* — Lun-See Lao
(74) *Attorney, Agent, or Firm* — Schwegman Lundberg & Woessner, P.A.

(57) ABSTRACT

This document discusses among other things apparatus and methods for protecting circuit elements from harmful voltages. In an example, an apparatus can include an amplifier configured to receive an input signal and to provide an estimate of a first output signal, a peak detector to receive the estimate and to generate a comparison signal that is active when the amplified input signal exceeds a threshold value, and a timer configured to activate a second output signal if the comparison signal is active for at least a selected time period. The timer can include a first digital input and the selected time period can be set using a state of the first digital input.

20 Claims, 5 Drawing Sheets

(56) References Cited

OTHER PUBLICATIONS

"Chinese Application Serial No. 201220160792.5, Office Action mailed Aug. 31, 2012", w/English Translation, 2 pgs.
"Chinese Application Serial No. 201220160792.5, Response filed Oct. 24, 2012 to Office Action mailed Aug. 31, 2012", w/English Claims, 18 pgs.
"Chinese Application Serial No. 201210110793.3, Office Action mailed Apr. 1, 2015", 5 pgs.

* cited by examiner

DC VOLTAGE ERROR PROTECTION CIRCUIT

CLAIM OF PRIORITY

This patent application claims the benefit of priority, under 35 U.S.C. Section 119(e), to Schreyer, U.S. Provisional Patent Application Ser. No. 61/475,817, entitled "DC VOLTAGE ERROR PROTECTION CIRCUIT," filed on Apr. 15, 2011, which is hereby incorporated by reference herein in its entirety.

BACKGROUND

Mobile devices, such as cellular "smart" phones, MPEG-1 Audio Layer III (MP3) devices, Wi-Fi-capable devices, and the 6 like, have become increasingly popular due to their continually enhanced functionality and performance. A popular (and often necessary) feature incorporated into most of these devices is an audio speaker for producing sounds, such as music or the spoken word. In many cases, a connector may also be supplied on the device to allow the user to connect earphones or similar devices for sound reproduction.

A significant concern of mobile device manufacturers is the protection of audio speakers that are incorporated into the device from damage due to improper voltages being placed across the speaker. A common type of damage-inflicting voltage is a direct-current (DC) mode voltage of sufficient magnitude and duration to cause permanent speaker damage. Preventing the application of such a voltage across a speaker is often difficult to implement, as some typical audible low-frequency audio signals may exhibit the characteristics of a voltage signal capable of damaging a speaker.

OVERVIEW

In certain examples, an apparatus can include an amplifier configured to receive an input signal and to provide an estimate of a first output signal, a peak detector to receive the estimate and to generate a comparison signal that is active when the amplified input signal exceeds a threshold value, and a timer configured to activate a second output signal if the comparison signal is active for at least a selected time period. The timer can include a first digital input and the selected time period can be set using a state of the first digital input.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized, among other things, a DC voltage error protection circuit which, in one example, can analyze an input voltage of another circuit, such as a speaker amplifier, to determine a potential output voltage of the that circuit. In some examples, the protection circuit can disable the other circuit if the output voltage of the other circuit is expected to maintain some minimum magnitude for a predetermined minimum period of time. In certain examples involving speaker or audio amplifiers, the protection circuit can provide a programmable tradeoff between speaker amplifier shutdown delay and low-frequency audio response of the speaker amplifier.

Figure 1:
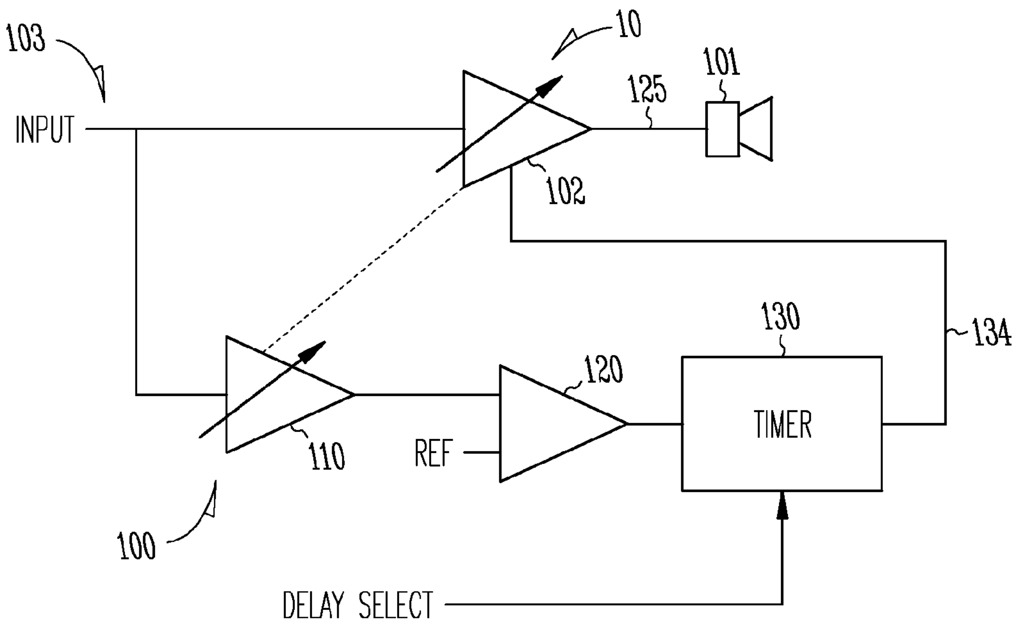
FIG. 1 illustrates generally an audio system 10 including an example DC voltage error protection circuit.

FIG. 1 illustrates generally an audio system 10 including an example DC voltage error protection circuit 100, an audio output transducer 101 and an audio amplifier 102 to generate a drive signal 125 to drive the audio output transducer 101. In certain examples, the DC voltage error protection circuit 100 can include a programmable amplifier 110, a peak detector 120, and a timer 130, such as a programmable timer. The DC voltage error protection circuit 100 is discussed herein in conjunction with audio systems, such as mobile device audio speakers, however, it is understood that other electrical systems susceptible to damage from prolonged exposure to certain levels of DC voltage can also benefit from the operation of the DC voltage error protection circuit 100. In certain examples, the DC voltage error protection circuit 100 can be incorporated within a single integrated circuit or semiconductor device, while, in other implementations, the DC voltage error protection circuit 100 may be an electrical circuit that is distributed among multiple electronic devices.

In one example, the DC voltage error protection circuit 100 receives and processes an input signal 103 that is also provided as an input to the audio amplifier 102, such as a Class D audio amplifier. Generally, if the DC voltage error protection circuit 100 detects an erroneous signal (e.g., one maintaining a voltage surpassing a predetermined threshold for at least some minimum period of time), the DC voltage error protection circuit 100 can assert an alarm signal 134. In some examples, the alarm signal 134 can be utilized to disable the audio amplifier, such as by way of a main analog system control block. In an example, the alarm signal can be asserted if the monitored input signal 103 results in a voltage at the speaker above a threshold of 1.5 volts (V) for an interval of time greater than about 2 milliseconds (ms). It is understood that other threshold voltages, time intervals and combinations thereof are possible without departing from the scope of the present subject matter. In some examples, a timer of a DC voltage error protection circuit 100 can have a default threshold value and a default time-out value.

Although it is possible to process the output of the audio amplifier 102 to detect potentially damaging DC voltages, processing of the input signal 103 of the audio amplifier 102 can provide a more workable voltage range in which to make peak detection measurements. Because of the lower voltage range, lower voltage, and less expensive, electrical components can be used for the DC voltage error protection circuit 100, especially for the peak detector 120. In certain examples, the programmable amplifier 110 can allow the peak detector 120 to maintain a consistent internal voltage threshold regardless of the output gain of the audio amplifier, thus facilitating a more stable and consistent peak detection process.

Figure 2:
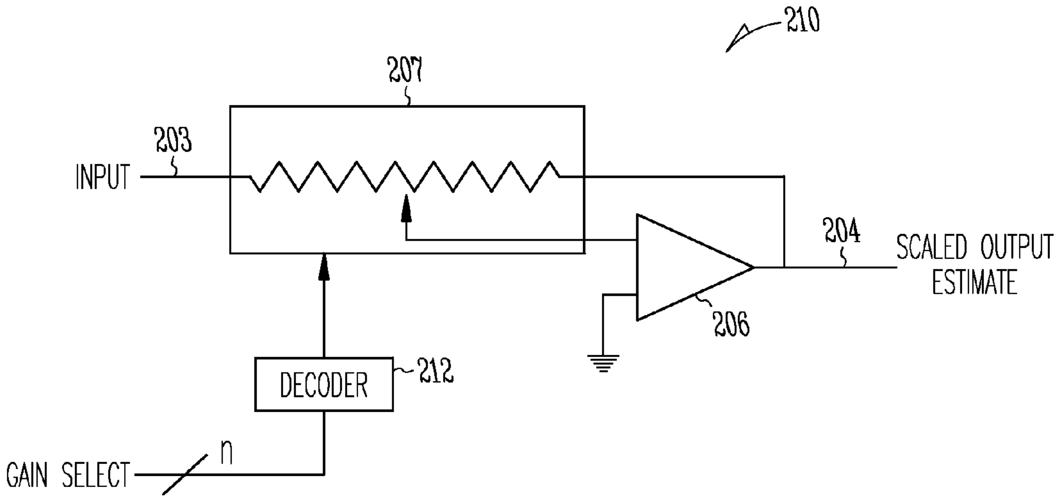
FIG. 2 illustrates generally an example programmable amplifier.

FIG. 2 illustrates generally an example programmable amplifier 210, which includes a decoder 212, an adjustable resistor ($R_f/R_{in}$) network 207, and an amplifier 206. Generally, the decoder 212 decodes a bit-significant digital input for selecting a configuration for the adjustable resistor network 207 that can determine the gain of the amplifier 206. In an example, the programmable amplifier 210 can have three possible gain values, such as 6 decibels (dB), 10 dB, and 14 dB, although other numbers of possible gain values, as well other values for the gain, may be employed in other examples. The amplifier 206 can amplifier the input signal 203 according to the gain provided by the programmed configuration of the resistor network 207 to produce a programmable amplifier voltage 204. In certain examples, the gain of the programmable amplifier can be set so lower voltage and less costly components can be used to provide peak detection of a representation of the audio amplifier output.

Figure 3:
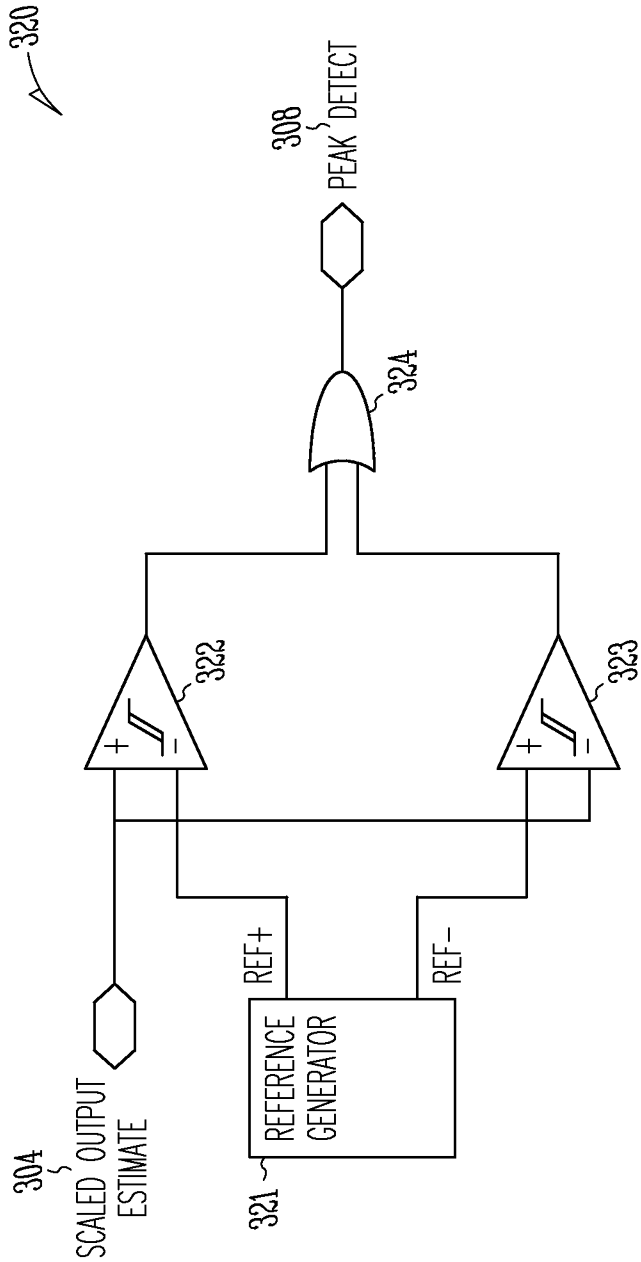
FIG. 3 illustrates at least a portion of an example peak detector of an example DC voltage error protection.

FIG. 3 illustrates at least a portion of an example peak detector 320 of an example DC voltage error protection such as the DC voltage error protection circuit 100 of FIG. 1. The peak detector 320 can include a threshold generator 321 and a positive peak comparator 322. In certain examples, the peak detector can include a negative peak comparator 323 and an OR gate 324 to provide the peak detector output 308. The peak detector 320 can receive a representation of an amplifier output 304 and can provide an indication of when the voltage of the amplifier output surpasses an internal voltage threshold via the peak detector output 308. In certain examples, the peak detector 320 can employ a substantially constant internal voltage threshold despite the output gain of the speaker amplifier varying, for example, because of volume adjustments. In an example, the threshold generator 321 can provide a positive peak threshold ($+V_{TH}$) for input to the positive peak comparator 322. In certain examples, the threshold generator 321 can provide a negative peak threshold ($-V_{TH}$) for input to the negative peak comparator 323. In one example, the voltage threshold ($+V_{TH}$, $-V_{TH}$) employed in the peak detector 320 can be set 10 dB below the peak output (speaker) voltage associated with a DC voltage error, resulting in a ratio of output voltage to voltage threshold of approximately 3.16:1. Thus, in an example in which the minimum speaker voltage threshold is 1.5 V, the associated voltage threshold internal to the peak detector 320 is approximately 474 millivolts (mV). If the representation of the amplifier output 304 exceeds the voltage threshold, the peak detector 320 activates a peak detector output 308. In some examples, the peak detector 320 may sense a positive peak voltage and a negative peak voltage of the representation of the amplifier output 304 and can employ an OR gate to provide the outputs of the peak detector 308.

Figure 4:
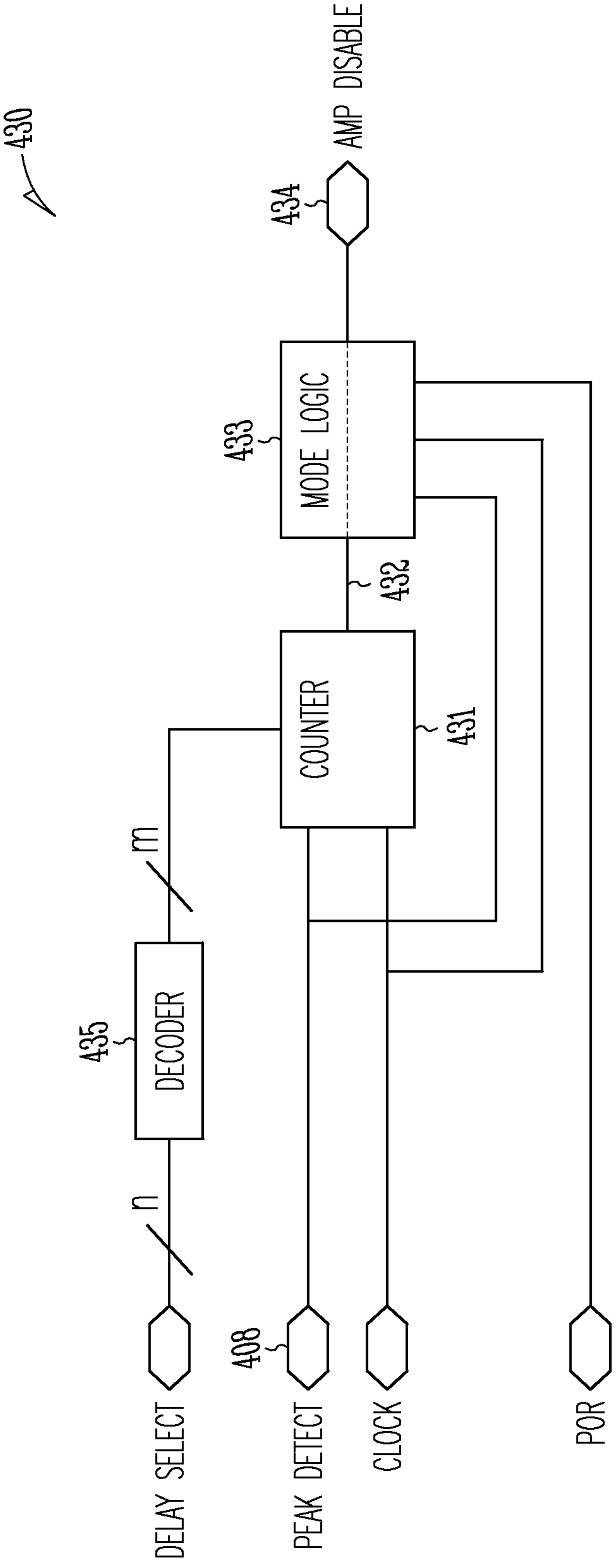
FIG. 4 illustrates generally an example of programmable timer of an example DC voltage error protection circuit.

FIG. 4 illustrates generally an example of programmable timer 430 of a DC voltage error protection circuit such as the DC voltage error protection circuit 100 illustrated in FIG. 1. In certain examples, the programmable timer 330 can include a programmable counter 431. The programmable counter can receive a clock signal (CLOCK), a threshold command (m), and an input signal 408, such as the output of a peak detector. Upon receiving an active input signal 408 (e.g., indicating a detected peak), the programmable counter 431 can count the clock pulses of the clock signal until an accumulated count reaches or exceeds a threshold setting or the active state of the input signal 408 becomes inactive, whichever occurs first. If the input signal 408 transitions from an active state to an inactive state before the accumulated count of the programmable counter 431 reaches the threshold setting, the programmable counter 431 is disabled and the accumulated count is reset. If the accumulated count reaches or exceeds the threshold setting, the output 432 of the programmable timer 431 can be set.

In certain examples, the programmable timer 430 can include mode logic 433 for edge-sensing, resetting, latching, or bypassing functions. Overall, the programmable timer 430 can delay propagation of the peak detect output received as the active input 408 to the output 434 of the programmable timer. In certain examples, the output 434 of the programmable timer can provide an alarm signal, such as an amplifier disable alarm. In certain examples, the programmable timer 430 can include a decoder 435 configured to receive delay select command signals to program the programmable counter 431. In certain examples, the decoder 435 can decode received delay select command signals to provide command signals (m) to the programmable counter 431 for setting the threshold setting. In certain examples, the decoder 435 can decode received command signals to provide command signals (m) to the programmable counter 431 that can disable the programmable counter 431, thus, disabling the DC protection circuit for test purposes, for example.

In one example, the output 434 can remain active until a software reset signal is applied, a (hardware) power-on-reset (POR) signal is applied, or the device including the DC voltage error protection circuit is powered down and powered back up. In some examples, the output 434 can be reset after a predetermined period of time.

In an example, the decoder 435 can receive a two-bit value of the delay select command signal that is coded into three possible 13-bit (e.g., m=13) counter values to be input to the programmable counter 431. In an example, the three counter values can correspond to time periods of 2 ms, 5 ms, and 15 ms, respectively, given a clock signal (CLOCK) of about 330 kilohertz (kHz) driving the programmable counter 431. In addition, another possible two-bit value of the delay select command signal can cause the programmable counter 431 to be deactivated, thus disabling activation of the output of the programmable timer. In certain examples, the programmable counter 431 can divides the input clock signal (CLOCK) using a programmable threshold setting to generate the time period against which a peak detect output can be compared to determine if an amplifier voltage has exceeded a protective voltage threshold for more than the predetermined time period.

Figure 5:
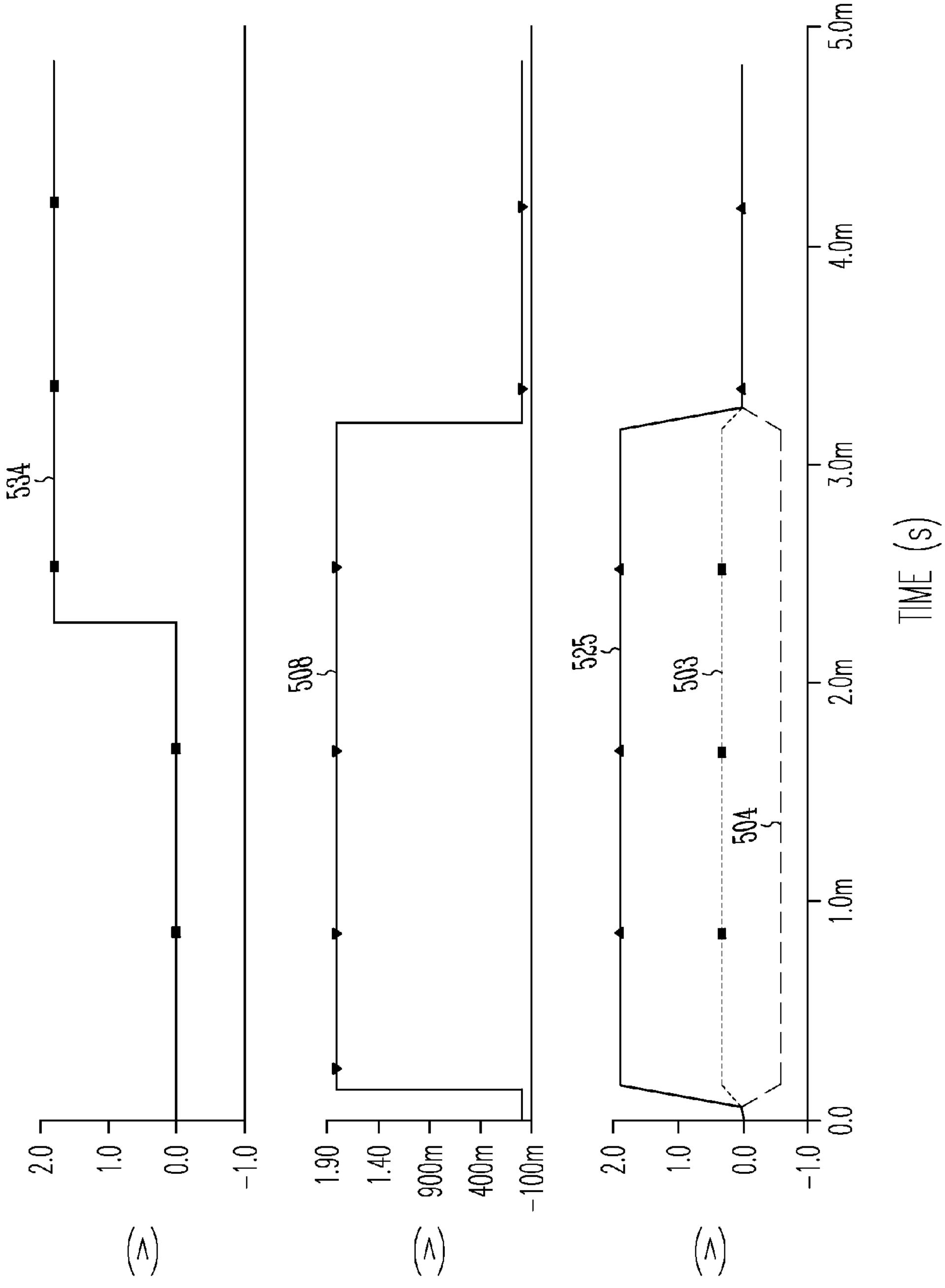
FIG. 5 is a timing diagram of an example simulation of an example DC voltage error protection circuit.

FIG. 5 is a timing diagram of an example simulation of the DC voltage error protection circuit such as the example DC voltage error protection circuit 100 of FIG. 1. In this example, the input voltage 503 exhibits an approximate 300 mV step voltage that extends for approximately 3 ms, which causes a step voltage of about 600 mV of the representative voltage 504 of the output of the audio amplifier voltage, and a drive signal 525 voltage of about 1.89 V for the output of the audio amplifier to be applied across a speaker. In an example, as the representative voltage 504 of 600 mV exceeds the 474 mV threshold of the peak detector, the peak detector can activate the peak detector output 508. As the activation of the peak detector output 508 extends for over 3 ms, and thus beyond the 2 ms limit set for the programmable timer, the programmable timer can activate an alarm signal 534 to disable the speaker power amplifier. In one example, the DC alarm signal 534 can remain active until a software reset signal is applied, a (hardware) power-on-reset signal is applied, or the device including the DC voltage error protection circuit 100 is powered down and powered back up. In some examples, the alarm signal can be deactivated after a predetermined period of time.

Additional Notes & Examples

In Example 1, an apparatus can include an amplifier configured to receive an input signal and to provide an estimate of a first output signal, a peak detector to receive the estimate and to generate a comparison signal that is active when the amplified input signal exceeds a threshold value, and a timer configured to activate a second output signal if the comparison signal is active for at least a selected time period. The timer can include a first digital input, and the selected time period can be set using a state of the first digital input.

In Example 2, the apparatus of Example 1 optionally includes a switch circuit configured to disable a second amplifier when the second output signal is active.

In example 3, the amplifier of any one or more of Examples 1-2 optionally includes a programmable amplifier.

In Example 4, a gain of the programmable amplifier of any one or more of Examples 1-3 optionally is configured to track a gain of the second amplifier.

In Example 5, a gain of the programmable amplifier of any one or more of Examples 1-4 optionally is set about 10 decibels (db) below the gain of the second amplifier.

In Example 6, the threshold value of any one or more of Examples 1-5 optionally is substantially constant.

In Example 7, the timer of any one or more of Examples 1-6 optionally is disabled using a second state of the first digital input.

In Example 8, the apparatus of any one or more of Examples 1-7 optionally includes a latch configured to maintain the active state of the second output signal.

In Example 9, the latch of any one or more of Examples 1-8 optionally is configured to reset upon the removal of a supply voltage from the apparatus.

In Example 10, an integrated circuit optionally includes the amplifier, the peak detector and the timer of any one or more of Examples 1-9.

In Example 11, a method can include receiving an input signal at a first amplifier, providing an estimate of a first output signal, comparing the estimate to a threshold, activating a comparison signal when the estimate exceed the threshold, enabling a timer when the comparison signal is active, activating a second output signal when the comparison signal is active for a selected time period, receiving a first digital input at the timer, and setting the selected time period according to a value of the first digital input.

In Example 12, the method of any one or more of Examples 1-11 optionally includes amplifying the input signal at a second amplifier to provide the first output signal to a load.

In Example 13, the providing an estimate of the first output signal of any one or more of Examples 1-12 optionally includes tracking the gain of the second amplifier with the gain of the first amplifier.

In Example 14, the tracking the gain of any one or more of Examples 1-13 optionally includes setting the gain of the first amplifier about 10 decibels (db) below the gain of the second amplifier.

In Example 15, the method of any one or more of Examples 1-14 optionally includes disabling the second amplifier when the second output signal becomes active.

In Example 16, the method of any one or more of Examples 1-15 optionally includes maintaining the second output signal in an active state using a latch after the second output signal is activated.

In Example 17, the method of any one or more of Examples 1-16 optionally includes unlatching the second output signal when a supply voltage is removed from the latch.

In Example 18, a system can include a load, an power amplifier configured to provide a power signal to the load, and a protection circuit configured to generate an estimate of the power signal and to disable the amplifier if the estimate of the power signal indicates the power signal exceeds a threshold value related to the load. The protection circuit can include a second amplifier configured to receive an input signal and to provide the estimate of power signal, a peak detector to receive the estimate and to generate a comparison signal that is active when the amplified input signal exceeds the threshold value, and a timer configured to activate an output signal if the comparison signal is active for at least a selected time period. The timer can include a first digital input, and the selected time period can be set using a state of the first digital input.

In Example 19, the protection circuit of any one or more of Examples 1-18 optionally is configured to disable the power amplifier when the output signal is activated.

In Example 20, the protection circuit of any one or more of Examples 1-19 optionally includes a latch configured to maintain an active state of the output signal until a supply voltage is removed from the protection circuit.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive-or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to impose numerical requirements on their objects.

The above description is intended to be illustrative, and not restrictive. For example, although the examples above may have been described relating to PNP devices, one or more examples can be applicable to NPN devices. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b) to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus, comprising:

an amplifier configured to simultaneously receive an input signal with a second amplifier and to provide an estimate of a first output signal of the second amplifier;

a peak detector to receive the estimate and to generate a comparison signal that is active when the estimate exceeds a threshold value; and a timer configured to activate a second output signal if the comparison signal is active for at least a selected time period, wherein the timer includes a first digital input, and wherein the selected time period is set using a state of the first digital input.

2. The apparatus of claim 1, including a switch circuit configured to disable the second amplifier when the second output signal is active.

3. The apparatus of claim 1, wherein the amplifier includes a programmable amplifier.

4. The apparatus of claim 3, wherein a gain of the programmable amplifier is configured to track a gain of the second amplifier.

5. The apparatus of claim 4, wherein a gain of the programmable amplifier is set about 10 decibels (db) below the gain of the second amplifier.

6. The apparatus of claim 4, wherein the threshold value is substantially constant.

7. The apparatus of claim 1, wherein the timer is disabled using a second state of the first digital input.

8. The apparatus of claim 1, including a latch configured to maintain the active state of the second output signal.

9. The apparatus of claim 8, wherein the latch is configured to reset upon the removal of a supply voltage from the apparatus.

10. The apparatus of claim 1, wherein an integrated circuit includes the amplifier, the peak detector and the timer.

11. A method comprising:

receiving an input signal at a first amplifier;

receiving the input signal at a second amplifier;

providing an estimate of a first output signal of the second amplifier;

comparing the estimate to a threshold;

activating a comparison signal when the estimate exceed the threshold;

enabling a timer when the comparison signal is active;

activating a second output signal when the comparison signal is active for a selected time period;

receiving a first digital input at the timer; and setting the selected time period according to a value of the first digital input.

12. The method of claim 11, including amplifying the input signal at the second amplifier to provide the first output signal to a load.

13. The method of claim 12, wherein providing an estimate of the first output signal includes tracking the gain of the second amplifier with the gain of the first amplifier.

14. The method of claim 13, wherein tracking the gain includes setting the gain of the first amplifier about 10 decibels (db) below the gain of the second amplifier.

15. The method of claim 11, including disabling the second amplifier when the second output signal becomes active.

16. The method of claim 15, including maintaining the second output signal in an active state using a latch after the second output signal is activated.

17. The method of claim 16, including unlatching the second output signal when a supply voltage is removed from the latch.

18. A system comprising:

a load;

an power amplifier configured to receive an input signal and to provide a power signal to the load; and a protection circuit configured to generate an estimate of the power signal and to disable the power amplifier if the estimate of the power signal indicates the power signal exceeds a threshold value related to the load, wherein the protection circuit includes:

an second amplifier configured to receive the input signal and to provide the estimate of power signal;

a peak detector to receive the estimate and to generate a comparison signal that is active when the amplified input signal exceeds the threshold value; and a timer configured to activate an output signal if the comparison signal is active for at least a selected time period, wherein the timer includes a first digital input, and wherein the selected time period is set using a state of the first digital input.

19. The system of claim 18, wherein the protection circuit is configured to disable the power amplifier when the output signal is activated.

20. The system of claim 19, wherein the protection circuit includes a latch configured to maintain an active state of the output signal until a supply voltage is removed from the protection circuit.

* * * * *